United States Patent [19]
Cole

[11] Patent Number: 5,356,183
[45] Date of Patent: Oct. 18, 1994

[54] COUPLING WITH ROTATING RETAINING RING HAVING CAM SURFACES

[75] Inventor: John Cole, Crawley, England

[73] Assignee: Smiths Industries Public Limited Company, London, England

[21] Appl. No.: 37,165

[22] Filed: Mar. 26, 1993

[30] Foreign Application Priority Data

Mar. 28, 1992 [GB] United Kingdom ............... 9207008
Apr. 25, 1992 [GB] United Kingdom ............... 9208994

[51] Int. Cl.⁵ .................................................. F16L 35/00
[52] U.S. Cl. ..................................... 285/305; 285/314; 285/178; 285/903; 285/308; 403/350
[58] Field of Search ............... 285/305, 308, 314, 317, 285/903, 921, 423, 321, 312, 178; 403/350, 351, 352, DIG. 7, DIG. 8

[56] References Cited

U.S. PATENT DOCUMENTS

| | | | |
|---|---|---|---|
| 965,286 | 7/1910 | Ferguson | 285/314 |
| 1,857,528 | 5/1932 | Cantell | 285/314 |
| 2,001,244 | 5/1935 | Ezell | 285/314 |
| 3,385,613 | 5/1968 | McCau | 285/178 |
| 3,588,149 | 6/1971 | Demler | 285/921 |
| 3,916,721 | 11/1975 | Egger | 403/DIG. 8 |
| 3,990,727 | 11/1976 | Gallagher | 285/423 |
| 4,412,694 | 11/1983 | Rosenberg | 285/178 |
| 4,632,436 | 12/1986 | Kimura | 285/305 |
| 4,632,437 | 12/1986 | Robson et al. | 403/350 |
| 4,804,213 | 2/1989 | Guest | 285/308 |
| 4,904,001 | 2/1990 | Sasa et al. | 285/903 |
| 4,991,882 | 2/1991 | Gähwiler | 285/423 |
| 5,052,725 | 10/1991 | Meyer et al. | 285/317 |
| 5,074,601 | 12/1991 | Spors et al. | 285/308 |
| 5,087,084 | 2/1992 | Gehring | 285/903 |
| 5,090,747 | 2/1992 | Kotake | 285/305 |
| 5,213,376 | 5/1993 | Szabo | 285/921 |

FOREIGN PATENT DOCUMENTS

| | | | |
|---|---|---|---|
| 0240452 | 10/1987 | European Pat. Off. . | |
| 9208976 | 10/1992 | Fed. Rep. of Germany . | |
| 922517 | 6/1947 | France . | |
| 51698 | 2/1990 | Japan | 285/903 |
| 564527 | 10/1944 | United Kingdom . | |
| 1007203 | 10/1965 | United Kingdom | 285/314 |
| 1483157 | 8/1977 | United Kingdom . | |
| 1566026 | 4/1980 | United Kingdom . | |
| 2109885 | 6/1983 | United Kingdom . | |
| 2257217 | 1/1993 | United Kingdom . | |

*Primary Examiner*—Eric K. Nicholson
*Attorney, Agent, or Firm*—Pollock, Vande Sande and Priddy

[57] ABSTRACT

A coupling for a corrugated conduit has a body with a rotatable retaining ring. The ring has inwardly-projecting locking bars with two finger grips which project outwardly through slots in the body. When the finger grips are held and the ring is rotated, the locking bars are displaced inwardly to lie between adjacent corrugations of the conduit and retain it in the coupling.

7 Claims, 3 Drawing Sheets

COUPLING WITH ROTATING RETAINING RING HAVING CAM SURFACES

BACKGROUND OF THE INVENTION

This invention relates to couplings

The invention is more particularly concerned with couplings for fitting onto corrugated tubing, conduits or other corrugated members.

There are several different forms of existing couplings which can be fitted onto corrugated tubing. These make use of teeth or other surface formations that, when pushed inwards, engage between corrugations on the tubing and lock it on the coupling. One such coupling is described in GB 2123106. This has teeth which are deformed inwardly when an outer collar is pushed axially onto the coupling. GB 2125501 describes a similar coupling in which the collar is held in position by means of bayonet fitting. A coupling is also sold by PMA Elektro A. G. which has a separate U-shape locking piece that is pushed into a slot in the body of the coupling so that it lies between the corrugations on the tubing.

These previous couplings have the disadvantage that the coupling is locked by putting together two separate parts. This means that the parts of the coupling are separate until locked, increasing the risk that parts will become lost either during initial installation or when subsequently removed.

BRIEF SUMMARY OF THE INVENTION

It is an object of the present invention to provide an improved coupling.

According to one aspect of the present invention there is provided a coupling for fitting to an externally corrugated elongate member, the coupling comprising a body having one end adapted to receive the elongate member and an opposite end provided with coupling means by which the coupling can be connected with a cooperating coupling, and annular retaining means carried by the body at least a part of which is displaceable in a plane transverse to the axis of the elongate member, the retaining means having at least one internally-projecting surface formation and at least one manually-engageable member that projects from the body such that by engaging the manually-engageable member and moving it in the said plane the surface formation can be displaced between a first position in which the or each surface formation is located relatively outwardly to enable entry of the corrugated member into the body and within the retaining means, and a second position in which the or each surface formation is located relatively inwardly to lie between adjacent corrugations on the elongate member and lock it in the body, and the retaining means not being removable from the body while the elongate member is inserted within the body.

The retaining member preferably has two inwardly-projecting surface formations located diametrically opposite one another which in the second position lie between adjacent corrugations on the elongate member. The retaining means is preferably of a resilient plastics material. The retaining member may be a resilient ring with bowed arms, the surface formations being provided on the bowed arms and the surface formations being movable outwardly to the first position to enable entry of the corrugated member by squeezing the two manually-engageable members towards one another.

Alternatively, the retaining member may be rotatable in the plane. The or each internally-projecting surface formation may be deflected inwardly on rotation of the retaining member by engagement of cooperating cam surfaces on the retaining member and the body. The retaining member and the body may have cooperating detents arranged to resist rotation of the retaining member to the first position. The retaining member may have two manually-engageable members located opposite one another. The or each manually-engageable member may project radially outwardly of the body through a slot in the wall of the body. The retaining member may be located in an internal annular groove in the body.

The manually-engageable member may be a radially-projecting collar that projects from one end of the body.

A coupling for a corrugated conduit will now be described, by way of example, with reference to the accompanying drawings.

DETAILED DESCRIPTION OF THE PREFERRED EMBODIMENTS

Figure 1:
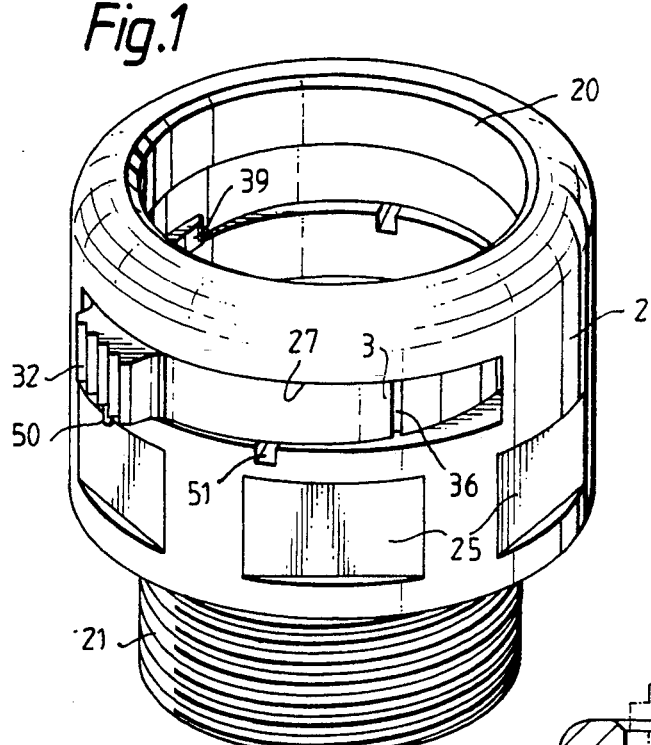
FIG. 1 is a perspective view of the coupling.
Figure 2:
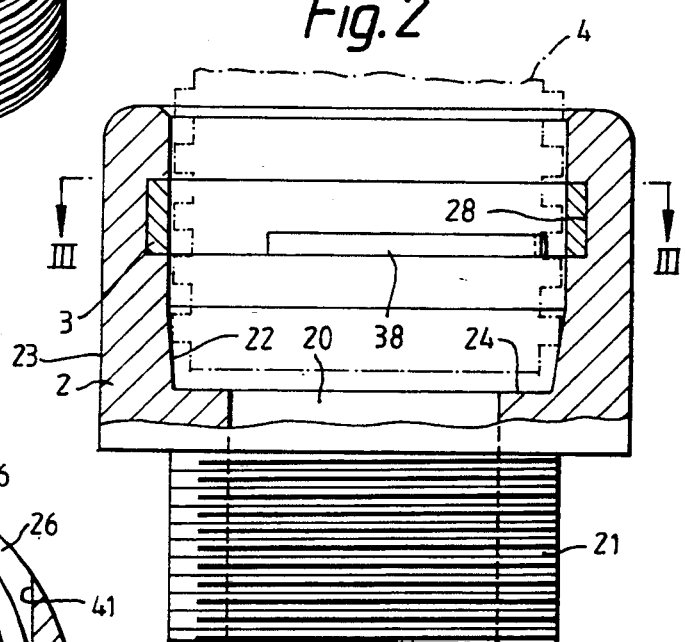
FIG. 2 is a sectional side elevation view through the coupling installed on a conduit.
Figure 3:
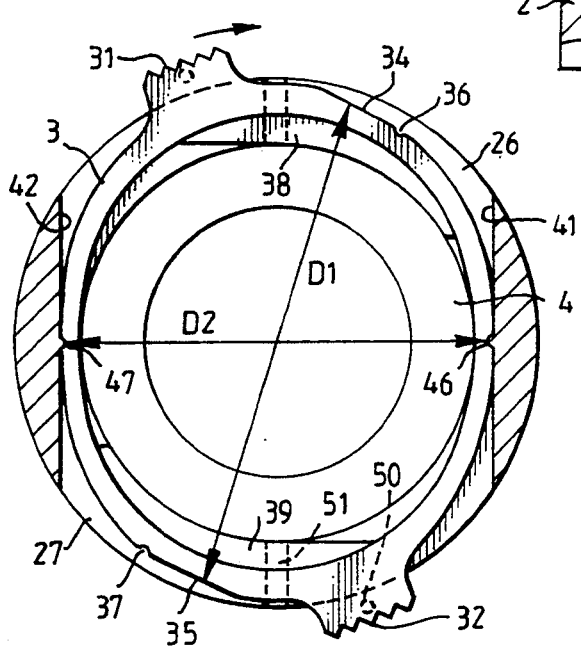
FIG. 3 is a sectional view along the line III—III of FIG. 2.

With reference first to FIGS. 1 to 3, the coupling 1 comprises two-parts, namely a body 2 and a retaining ring 3 which is mounted in the body. In use, the coupling 1 is mounted on the end of a circumferentially-corrugated conduit 4.

The body 2 is a one-piece plastics moulding of cylindrical shape and generally circular shape, with an axial bore 20 extending through it. The lower part 21 of the body 2 has an external diameter of about 20mm and is externally threaded so that the coupling 1 can be screwed into a cooperating coupling (not shown) having a female screw thread. The bore 20 through the lower part 21 of the body is about 15mm in diameter and this opens into a tapered section 22 at the lower end of the upper part 23 of the body. The tapered section 22 has a diameter of about 19mm at its lower end so that an annular shoulder 24 is formed between the tapered section and the lower part of the bore 20. At its upper end, the tapered section 22 has a diameter of about 21mm, the bore 20 continuing for the remainder of the length of the body 2 with this contant diameter. Externally, the upper part 23 of the body is of circular section apart from hexagonal flats 25 formed around its lower end which enables the coupling to be rotated with a spanner. Close to its upper end, two slots 26 and 27 extend through the wall of the body 2 diametrically opposite one another. The slots 26 and 27 open into an annular groove 28 formed around the inside of the body level with the slots.

The retaining ring 3 is located in the groove 28 and the slots 26 and 27 in the body 2 so that it lies in a plane transverse to the axis of the body and the conduit 4. The ring 3 is a one-piece moulding of a hard, resilient plastics material such as nylon. The ring 3 is of generally circular, annular shape with two finger grips 31 and 32 which are located diametrically opposite one another and project through the slots 26 and 27 respectively. To the right of the finger grip 31 the ring 3 has a cam surface 34 on its outer edge; a similar cam surface 35 is formed to the left of the finger grip 32. The external diameter D1 of the ring 3 is greater between the two camming surfaces 34 and 35 than the diameter D2 shown horizontal in FIG. 3. The external edge of the ring 3 is also provided with two detent recesses 36 and 37 located diametrically opposite one another in the region of the camming surfaces 34 and 35. Around its internal edge, the ring 3 has two opposite inwardly-projecting locking bars 38 and 39 which each extend around about 90 degrees of the circumference of the ring in alignment with the cam surfaces 34 and 35. The bars 38 and 39 taper in radial height along their length, being highest about midway along where they are about equal to the depth of the recesses between adjacent corrugations on the conduit 4. The bars 38 and 39 are located around the lower edge of the ring 3 and are only about one quarter the thickness of the ring. On the underside of both finger grips 31 and 32 there is a small pip 50 which prevents insertion and withdrawal of the ring 3 through the slots 26 and 27 except when the pips are aligned with small grooves 51 formed at the lower edge of the slots.

On the body 2, there are formed two flat cam surfaces 41 and 42 located diametrically opposite one another, intermediate the slots 26 and 27.

In its fully open position, the finger grips 31 and 32 are located in an anticlockwise position. In this position, the camming surfaces 34 and 35 on the ring 3 are located spaced from the camming surfaces 41 and 42 on the body 2 and the internal diameter of the ring between the locking bars 38 and 39 is slightly greater than the maximum external diameter of the conduit 4. The conduit 4 can, therefore, be freely inserted into or withdrawn from the coupling.

When it is desired to push the coupling 1 onto the end of the conduit 4, the installer checks that the ring 3 is rotated fully anticlockwise to its open, first position and then pushes the conduit as far as it will go into the coupling 1, until its lower end contacts the tapered section 22. The diameter of the tapered section 22 is chosen so that, at some point between its ends, it is equal to the maximum diameter of the conduit. In this way, the tapered section 22 forms a seal with the lower end of the conduit 4.

After insertion of the conduit 4, the finger grips 31 and 32 are gripped and rotated clockwise, through the intermediate position shown in FIG. 3, as far as they will go to a closed, second position. As the ring 3 rotates, the camming surfaces 34 and 35 on the ring move over the camming surfaces 41 and 42 on the body 2 so that the ring is deformed radially inwardly and, more particularly, the locking bars 38 and 39 are deformed inwardly. When fully rotated, to the closed position, locking bars 38 and 39 project inwardly between adjacent corrugations on the conduit 4 and prevent withdrawal of the conduit. In this position, the detent recesses 36 and 37 on the ring 3 snap onto detent projections 46 and 47 on the camming surfaces 41 and 42 so that rotation of the ring back to an open position is resisted. The conduit 4 can subsequently be removed, if necessary, by twisting the ring 3 back to its open position, with sufficient force to overcome the detents 36 and 46 and 37 and 47. When the coupling 1 is mounted on the conduit 4, it can be rotated freely on the conduit since the locking bars 38 and 39 of the ring 3 can slide around the valley between adjacent corrugations. This enables the coupling 1 to be screwed into a cooperating coupling after installation on the conduit 4.

The coupling 1 is preferably supplied with the ring 3 located in position in the body 2. Although it is possible to pull out the ring 3 before installation, through one of the slots 26 or 27, friction and the pips 50 reduce to a minimum the risk of the ring falling out of the coupling. After installation on the conduit 4, removal of the ring 3 is prevented because the conduit is completely encircled by the ring.

The coupling could be used for fitting onto corrugated tubing, cable or any other corrugated elongate member.

Figure 4:
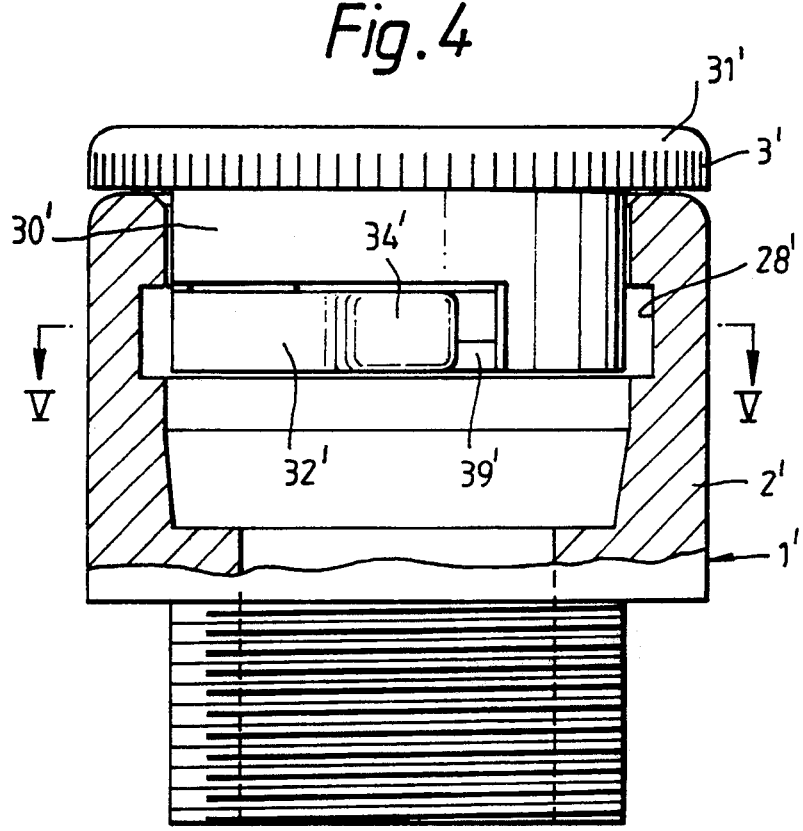
FIG. 4 is a partly sectional side elevation through a modified coupling in its open position.
Figure 5:
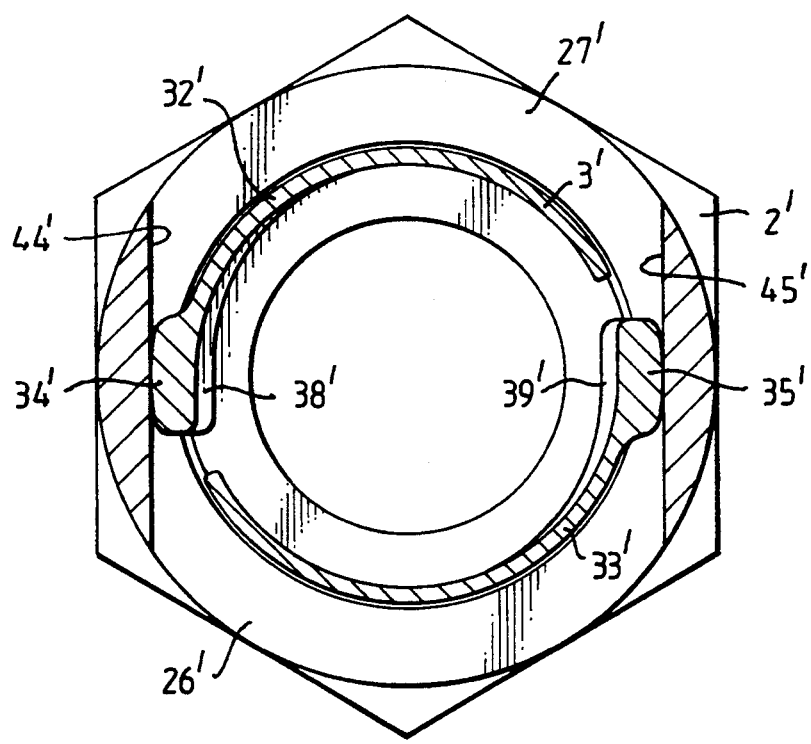
FIG. 5 is a sectional view along the line V—V of FIG. 4 in a closed position.

Various changes to the coupling are possible such as illustrated in FIGS. 4 and 5 which show a modified coupling 1'. The body 2' of this coupling is identical to the body 2 shown in FIGS. 1 to 3 but the retaining ring 3' is of a different construction. The ring 3' takes the form of a short sleeve 30' with a knurled, radially-projecting collar 31' at one end, and two spring locking arms 32' and 33' of arcuate shape. The locking arms are each attached to the sleeve 30' at one end only and have radially inwardly-projecting locking bars 38' and 39' extending around the lower edge of the arms. On their outer surface, the arms 32' and 33' have camming surfaces 34' and 35'. When located in the body 2', the collar 31' abuts the end of the body and the locking arms 32' and 33' are located in the groove 28' with the resilience of the arms urging the camming surfaces 34' and 35' outwardly into contact with the floor of the groove 28'. Rotation of the ring 3' causes the camming surfaces 34' and 35' on the arms 32' and 33' to slide over the camming surfaces 44' and 45' on the groove so that the arms are deflected inwardly. This causes the locking bars 38' and 39' to be deformed inwardly into the valleys between corrugations on the conduit. It can be seen that the slots 26' and 27' on the body 2' are not needed in this modification and can be dispensed with if desired.

Figure 6:
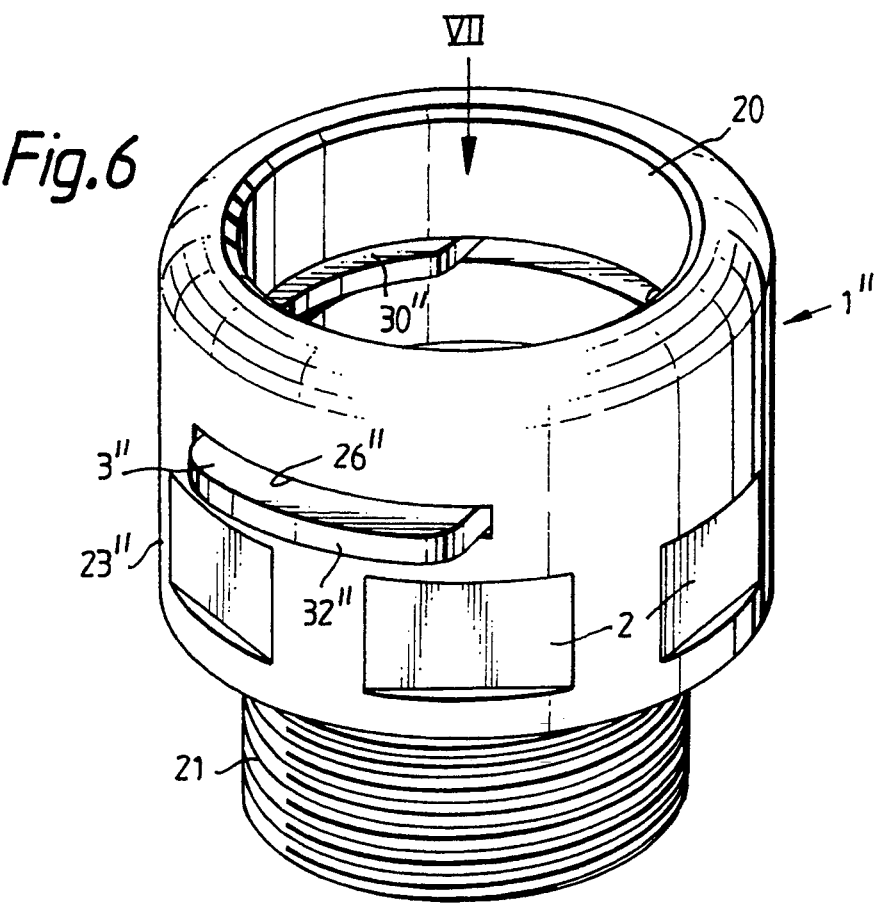
FIG. 6 is a perspective view of a further alternative coupling.
Figure 7:
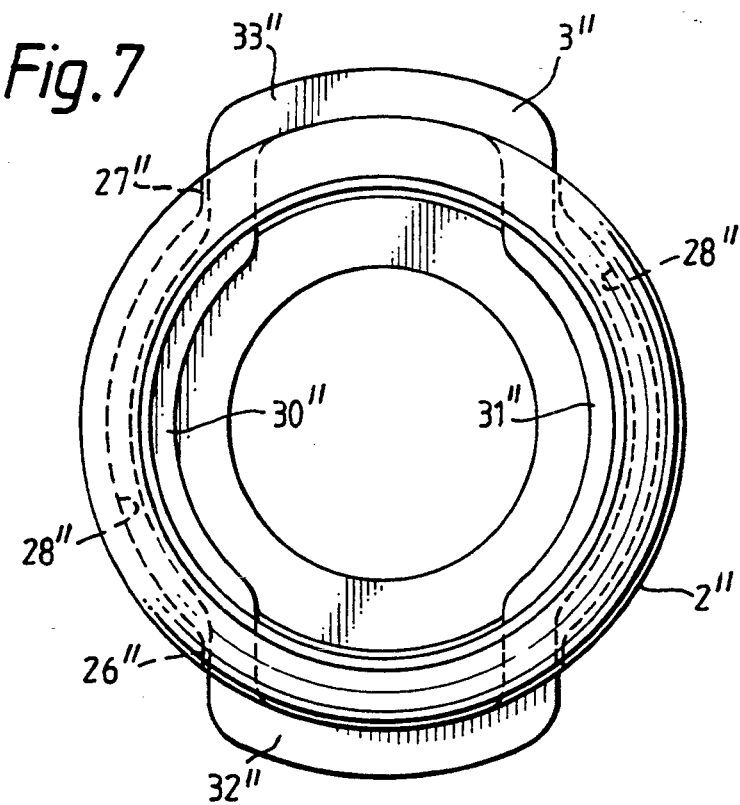
FIG. 7 is a plan view of the coupling of FIG. 6 along the arrow VII before installation on a conduit.

A further alternative form of coupling 1" is shown in FIGS. 6 and 7. In this embodiment, the retaining ring 3" is of generally rectangular, annular shape with two outwardly-bowed retaining arms 30" and 31" linked at opposite ends by lateral finger grips or manually-engageable members 32" and 33". The arms 30" and 31" extend along a groove 28", with the finger grips 32" and 33" projecting through slots 26" and 27" respectively. In the normal, relaxed state of the ring 3", the finger grips 32" and 33" both project outwardly beyond the external surface of the body 2". The external width of the ring 3" across the widest part of the arms 30" and 31" is less than the diameter of the groove 28" so that there is clearance between the outside of the ring 3" and the bottom of the groove. The internal width of the ring 3" is chosen to be equal to the minimum diameter of the conduit across the valleys of the corrugations. It can be seen, therefore, that the external width of the ring 3" is less than the maximum diameter of the conduit, that is, across the hills of corrugations. In its relaxed state, therefore, as shown, the ring 3" would prevent entry of the end of a conduit into the coupling.

When it is desired to push the coupling 1" onto the end of a conduit, the installer simply squeezes the two finger grips 32" and 33" inwardly towards one another against the resilience of the ring 3". This causes deformation of the ring 3" and, more particularly, outward displacement of the arms 30" and 31" in the plane transverse to the axis of the coupling 1" and the conduit. The arms 30" and 31" are distorted away from one another outwardly in the groove 28" until the internal width of the ring 3" exceeds the maximum diameter of the conduit. The conduit is then pushed as far as it will go into the coupling 1".

After insertion of the conduit 4, the finger grips 32" and 33" are released so that the resilience of the ting 3" allows the arms 30" and 3 1" to move back to their relaxed position where they extend between adjacent corrugations on the conduit and prevent its removal.

What I claim is:

1. A coupling for fitting to an externally corrugated elongate member, the coupling comprising: a body having one end adapted to receive the elongate member and an opposite end provided with coupling means by which the coupling can be connected with a cooperating coupling; and annular retaining means carried by the body, at least part of said annular retaining means being rotatable in a plane transverse to an axis of the elongate member and fixed relative to the body, the retaining means and the body having cooperating cam surfaces, the retaining means having at least one internally-projecting surface formation and at least one manually-engageable member that projects from the body such that by engaging the manually-engageable member and rotating it in said plane, the cam surfaces rotate relative to one another and thereby displace the surface formation between a first position in which the surface formation is located relatively outwardly to enable entry of the corrugated member into the body and within the retaining means, and a second position in which the surface formation is located relatively inwardly to lie between adjacent corrugations on the elongate member and lock it in the body, and wherein the retaining means cannot be removed from the body while the elongate member is inserted within the body.

2. A coupling according to claim 1, wherein the retaining means has two internally-projecting surface formations, located diametrically opposite one another, which in the second position lie between adjacent corrugations on the elongate member.

3. A coupling according to claim 1, wherein the retaining means and the body have cooperating detents, and wherein said detents are arranged to resist rotation of the retaining means to the first position.

4. A coupling according to claim 1, wherein the retaining means has two manually-engageable members located opposite one another.

5. A coupling according to claim 1, wherein the body has a slot in a wall, and wherein the manually-engageable member projects radially outwardly of the body through the slot.

6. A coupling according to claim 1, wherein the manually-engageable member is a radially-projecting collar, and wherein the collar projects from one end of the body.

7. A coupling according to claim 1, wherein the body has an internal annular groove, and wherein the retaining means is located in the groove.

* * * * *